US007480547B2

United States Patent
Brown et al.

(10) Patent No.: US 7,480,547 B2
(45) Date of Patent: Jan. 20, 2009

(54) ATTITUDE SENSING SYSTEM FOR AN AUTOMOTIVE VEHICLE RELATIVE TO THE ROAD

(75) Inventors: Todd Brown, Dearborn, MI (US); Erik Chubb, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 10/907,748

(22) Filed: Apr. 14, 2005

(65) Prior Publication Data

US 2006/0235575 A1 Oct. 19, 2006

(51) Int. Cl.
*G06F 19/00* (2006.01)

(52) U.S. Cl. .............................. 701/1; 701/45; 340/440; 280/5.5; 280/755

(58) Field of Classification Search .................. 701/1, 701/36, 41, 45; 180/271, 282–283; 280/5.5, 280/5.502, 5.506, 5.51, 755; 340/429, 440
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,797,893 A | 3/1974 | Burckhardt | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,294,113 A | 10/1981 | Sprott et al. | |
| 4,480,714 A | 11/1984 | Yabuta et al. | |
| 4,548,079 A | 10/1985 | Klatt | |
| 4,592,565 A | 6/1986 | Eagle | |
| 4,597,462 A | 7/1986 | Sano et al. | |
| 4,624,476 A | 11/1986 | Tanaka et al. | |
| 4,650,212 A | 3/1987 | Yoshimura | |
| 4,679,808 A | 7/1987 | Ito et al. | |
| 4,690,553 A | 9/1987 | Fukamizu et al. | |
| 4,696,489 A | 9/1987 | Fujishiro et al. | |
| 4,705,130 A | 11/1987 | Fukunaga et al. | |
| 4,712,807 A | 12/1987 | Kurosawa | |
| 4,761,022 A | 8/1988 | Ohashi | |

(Continued)

FOREIGN PATENT DOCUMENTS

DE 36 16 907 11/1987

(Continued)

OTHER PUBLICATIONS

U.S. Appl. No. 10/459,697, filed Jun. 11, 2003, Lu.

(Continued)

*Primary Examiner*—Yonel Beaulieu
(74) *Attorney, Agent, or Firm*—Angela M. Brunetti; Frederick Owens

(57) ABSTRACT

A system (18) for controlling a system or device (44) of an automotive vehicle (10) includes a roll rate sensor (34). A controller (26) determines a lateral velocity of the automotive vehicle (10) in response to the roll rate. The controller (26) also controls the vehicle system or device (44) in response to the lateral velocity.

31 Claims, 4 Drawing Sheets

U.S. PATENT DOCUMENTS

| | | | |
|---|---|---|---|
| 4,765,649 A | 8/1988 | Ikemoto et al. | |
| 4,767,588 A | 8/1988 | Ito | |
| 4,778,773 A | 10/1988 | Sukegawa | |
| 4,797,823 A | 1/1989 | Ikemoto et al. | |
| 4,809,183 A | 2/1989 | Eckert | |
| 4,827,416 A | 5/1989 | Kawagoe et al. | |
| 4,846,496 A | 7/1989 | Tanaka et al. | |
| 4,872,116 A | 10/1989 | Ito et al. | |
| 4,888,696 A | 12/1989 | Akatsu et al. | |
| 4,898,431 A | 2/1990 | Karnopp et al. | |
| 4,930,082 A | 5/1990 | Harara et al. | |
| 4,951,198 A | 8/1990 | Watanabe et al. | |
| 4,960,292 A | 10/1990 | Sadler | |
| 4,964,679 A | 10/1990 | Rath | |
| 4,967,865 A | 11/1990 | Schindler | |
| 4,976,330 A | 12/1990 | Matsumoto | |
| 4,998,593 A | 3/1991 | Karnopp et al. | |
| 5,002,142 A | 3/1991 | Klosterhaus | |
| 5,033,770 A | 7/1991 | Kamimura et al. | |
| 5,058,017 A | 10/1991 | Adachi et al. | |
| 5,066,041 A | 11/1991 | Kindermann et al. | |
| 5,085,458 A | 2/1992 | Kii et al. | |
| 5,088,040 A | 2/1992 | Matsuda et al. | |
| 5,089,967 A | 2/1992 | Haseda et al. | |
| 5,097,917 A | 3/1992 | Serizawa et al. | |
| 5,159,553 A | 10/1992 | Karnopp et al. | |
| 5,163,319 A | 11/1992 | Spies et al. | |
| 5,189,920 A | 3/1993 | Martinez | |
| 5,200,896 A | 4/1993 | Sato et al. | |
| 5,208,749 A | 5/1993 | Adachi et al. | |
| 5,224,765 A | 7/1993 | Matsuda | |
| 5,228,757 A | 7/1993 | Ito et al. | |
| 5,230,396 A | 7/1993 | Yasui | |
| 5,239,868 A | 8/1993 | Takenaka et al. | |
| 5,247,466 A | 9/1993 | Shimada et al. | |
| 5,261,503 A | 11/1993 | Yasui | |
| 5,265,020 A | 11/1993 | Nakayama | |
| 5,274,576 A | 12/1993 | Williams | |
| 5,278,761 A | 1/1994 | Ander et al. | |
| 5,282,134 A | 1/1994 | Gioutsos et al. | |
| 5,297,646 A | 3/1994 | Yamamura et al. | |
| 5,307,274 A | 4/1994 | Takata et al. | |
| 5,311,431 A | 5/1994 | Cao et al. | |
| 5,311,956 A | 5/1994 | Sugiyama | |
| 5,324,102 A | 6/1994 | Roll et al. | |
| 5,335,176 A | 8/1994 | Nakamura | |
| 5,365,439 A | 11/1994 | Momose et al. | |
| 5,370,199 A | 12/1994 | Akuta et al. | |
| 5,408,411 A | 4/1995 | Nakamura et al. | |
| 5,438,515 A | 8/1995 | Miichi et al. | |
| 5,446,658 A * | 8/1995 | Pastor et al. | 701/1 |
| 5,455,770 A | 10/1995 | Hadeler et al. | |
| 5,490,063 A | 2/1996 | Genise | |
| 5,510,989 A | 4/1996 | Zabler et al. | |
| 5,515,277 A | 5/1996 | Mine | |
| 5,548,536 A | 8/1996 | Ammon | |
| 5,549,328 A | 8/1996 | Cubalchini | |
| 5,560,688 A | 10/1996 | Schappler et al. | |
| 5,576,957 A | 11/1996 | Asanuma et al. | |
| 5,579,245 A | 11/1996 | Kato | |
| 5,598,335 A | 1/1997 | You | |
| 5,602,734 A | 2/1997 | Kithil | |
| 5,610,575 A | 3/1997 | Gioutsos | |
| 5,627,756 A | 5/1997 | Fukada et al. | |
| 5,634,698 A | 6/1997 | Cao et al. | |
| 5,640,324 A | 6/1997 | Inagaki | |
| 5,648,903 A | 7/1997 | Liubakka | |
| 5,671,982 A | 9/1997 | Wanke | |
| 5,676,433 A | 10/1997 | Inagaki et al. | |
| 5,684,702 A | 11/1997 | Phillips et al. | |
| 5,694,319 A | 12/1997 | Suissa et al. | |
| 5,703,776 A | 12/1997 | Soung | |
| 5,707,117 A | 1/1998 | Hu et al. | |
| 5,707,120 A | 1/1998 | Monzaki et al. | |
| 5,719,790 A | 2/1998 | Lohrenz et al. | |
| 5,720,533 A | 2/1998 | Pastor et al. | |
| 5,723,782 A | 3/1998 | Bolles, Jr. | |
| 5,732,377 A | 3/1998 | Eckert | |
| 5,732,378 A | 3/1998 | Eckert et al. | |
| 5,732,379 A | 3/1998 | Eckert et al. | |
| 5,736,939 A | 4/1998 | Corcoran | |
| 5,737,224 A | 4/1998 | Jeenicke et al. | |
| 5,740,041 A | 4/1998 | Iyoda | |
| 5,740,877 A | 4/1998 | Sasaki | |
| 5,742,918 A | 4/1998 | Ashrafi et al. | |
| 5,742,919 A | 4/1998 | Ashrafi et al. | |
| 5,762,406 A | 6/1998 | Yasui et al. | |
| 5,774,819 A | 6/1998 | Yamamoto et al. | |
| 5,782,543 A | 7/1998 | Monzaki et al. | |
| 5,787,375 A | 7/1998 | Madau et al. | |
| 5,801,647 A | 9/1998 | Survo et al. | |
| 5,809,434 A | 9/1998 | Ashrafi et al. | |
| 5,816,670 A | 10/1998 | Yamada et al. | |
| 5,825,284 A | 10/1998 | Dunwoody et al. | |
| 5,842,143 A | 11/1998 | Lohrenz et al. | |
| 5,857,160 A | 1/1999 | Dickinson et al. | |
| 5,857,535 A | 1/1999 | Brooks | |
| 5,869,943 A | 2/1999 | Nakashima et al. | |
| 5,878,357 A | 3/1999 | Sivashankar et al. | |
| 5,890,084 A | 3/1999 | Halasz et al. | |
| 5,893,896 A | 4/1999 | Imamura et al. | |
| 5,925,083 A | 7/1999 | Ackermann | |
| 5,926,087 A | 7/1999 | Busch | |
| 5,931,546 A | 8/1999 | Nakashima et al. | |
| 5,935,181 A | 8/1999 | Iwasaki | |
| 5,941,920 A | 8/1999 | Schubert | |
| 5,944,137 A | 8/1999 | Moser et al. | |
| 5,944,392 A | 8/1999 | Tachihata et al. | |
| 5,946,644 A | 8/1999 | Cowan et al. | |
| 5,964,819 A | 10/1999 | Naito | |
| 5,965,808 A | 10/1999 | Normann | |
| 5,971,503 A | 10/1999 | Joyce et al. | |
| 6,002,974 A | 12/1999 | Schiffmann | |
| 6,002,975 A | 12/1999 | Schiffmann et al. | |
| 6,026,926 A | 2/2000 | Noro et al. | |
| 6,038,495 A | 3/2000 | Schiffmann | |
| 6,040,916 A | 3/2000 | Griesinger | |
| 6,050,360 A | 4/2000 | Pattok et al. | |
| 6,055,472 A | 4/2000 | Breunig et al. | |
| 6,062,336 A | 5/2000 | Amberkar et al. | |
| 6,065,558 A | 5/2000 | Wielenga | |
| 6,073,065 A | 6/2000 | Brown et al. | |
| 6,079,513 A | 6/2000 | Nishizaki et al. | |
| 6,081,761 A | 6/2000 | Harada et al. | |
| 6,085,133 A | 7/2000 | Keuper et al. | |
| 6,085,860 A | 7/2000 | Hackl et al. | |
| 6,086,168 A | 7/2000 | Rump | |
| 6,089,344 A | 7/2000 | Baughn et al. | |
| 6,104,284 A | 8/2000 | Otsuka | |
| 6,121,873 A | 9/2000 | Yamada et al. | |
| 6,122,568 A | 9/2000 | Madau et al. | |
| 6,122,584 A | 9/2000 | Lin et al. | |
| 6,129,172 A | 10/2000 | Yoshida | |
| 6,141,604 A | 10/2000 | Mattes et al. | |
| 6,141,605 A | 10/2000 | Joyce | |
| 6,144,904 A | 11/2000 | Tseng | |
| 6,149,251 A | 11/2000 | Wuerth et al. | |
| 6,161,905 A | 12/2000 | Hac et al. | |
| 6,167,357 A | 12/2000 | Zhu | |
| 6,169,939 B1 | 1/2001 | Raad et al. | |
| 6,169,946 B1 | 1/2001 | Griessbach | |
| 6,170,594 B1 | 1/2001 | Gilbert | |
| 6,176,555 B1 | 1/2001 | Semsey | |
| 6,178,365 B1 | 1/2001 | Kawagoe et al. | |

| | | |
|---|---|---|
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafi et al. |
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,232,875 B1 | 5/2001 | DeZorzi |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B2 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,360,147 B1 | 3/2002 | Lee |
| 6,363,309 B1 | 3/2002 | Irie et al. |
| 6,366,844 B1 | 4/2002 | Woywod et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,424,897 B1 | 7/2002 | Mattes et al. |
| 6,427,102 B1 | 7/2002 | Ding |
| 6,428,118 B1 | 8/2002 | Blosch |
| 6,433,681 B1 | 8/2002 | Foo et al. |
| 6,438,463 B1 | 8/2002 | Tobaru et al. |
| 6,438,464 B1 | 8/2002 | Woywod et al. |
| 6,456,194 B1 | 9/2002 | Carlson et al. |
| 6,459,990 B1 | 10/2002 | McCall et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,502,023 B1 | 12/2002 | Fukada |
| 6,523,637 B1 | 2/2003 | Nakano et al. |
| 6,526,342 B1 | 2/2003 | Burdock et al. |
| 6,529,803 B2 | 3/2003 | Meyers et al. |
| 6,529,811 B2 | 3/2003 | Watson et al. |
| 6,542,073 B2 | 4/2003 | Yeh et al. |
| 6,547,022 B2 | 4/2003 | Hosomi et al. |
| 6,553,284 B2 | 4/2003 | Holst et al. |
| 6,554,293 B1 | 4/2003 | Fennel et al. |
| 6,556,908 B1 | 4/2003 | Lu et al. |

| | | | |
|---|---|---|---|
| 6,542,792 B2 | 5/2003 | Schubert et al. | |
| 6,559,634 B2 | 5/2003 | Yamada | |
| 6,593,849 B2 | 7/2003 | Chubb | |
| 6,598,946 B2 | 7/2003 | Nagae | |
| 6,600,414 B2 | 7/2003 | Foo et al. | |
| 6,600,985 B2 | 7/2003 | Weaver | |
| 6,618,656 B2 | 9/2003 | Kueblbeck et al. | |
| 6,631,317 B2 | 10/2003 | Lu | |
| 6,637,543 B2 | 10/2003 | Card | |
| 6,644,454 B2 | 11/2003 | Yamada et al. | |
| 6,650,971 B2 | 11/2003 | Haas | |
| 6,654,674 B2 | 11/2003 | Lu et al. | |
| 6,657,539 B2 | 12/2003 | Yamamoto et al. | |
| 6,678,631 B2 | 1/2004 | Schiffmann | |
| 6,681,196 B2 | 1/2004 | Glaser et al. | |
| 6,698,542 B2 | 3/2004 | Nishizaki et al. | |
| 6,704,631 B2 | 3/2004 | Winner et al. | |
| 6,718,248 B2 | 4/2004 | Lu | |
| 6,719,087 B2 | 4/2004 | Demerly | |
| 6,681,881 B2 | 6/2004 | Andonian et al. | |
| 6,745,624 B2 | 6/2004 | Porter | |
| 6,747,553 B2 | 6/2004 | Yamada et al. | |
| 6,756,890 B1 | 6/2004 | Schramm et al. | |
| 6,766,875 B2 | 7/2004 | Yamamoto | |
| 6,784,794 B1 | 8/2004 | McQuade | |
| 6,799,092 B2 | 9/2004 | Lu | |
| 6,816,764 B2 | 11/2004 | Coelingh et al. | |
| 6,834,218 B2 | 12/2004 | Meyers et al. | |
| 7,020,552 B2 * | 3/2006 | Park | 701/45 |
| 2002/0109310 A1 | 8/2002 | Lim | |
| 2003/0055549 A1 | 3/2003 | Barta et al. | |
| 2003/0109939 A1 | 6/2003 | Burgdorf et al. | |
| 2003/0171865 A1 | 9/2003 | Moser | |
| 2003/0182025 A1 | 9/2003 | Tseng et al. | |
| 2004/0010383 A1 | 1/2004 | Lu | |
| 2004/0019418 A1 | 1/2004 | Lu | |
| 2004/0026158 A1 | 2/2004 | Rieth et al. | |
| 2004/0064246 A1 | 4/2004 | Lu | |
| 2004/0078131 A1 | 4/2004 | Faye | |
| 2004/0119335 A1 | 6/2004 | Szabo et al. | |
| 2004/0158368 A1 | 8/2004 | Haas | |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| DE | 10065010 | 12/2000 |
| DE | 10046036 | 3/2002 |
| DE | 10133409 | 1/2003 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |

| | | |
|---|---|---|
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | WO 02/20318 | 3/2002 |

OTHER PUBLICATIONS

U.S. Appl. No. 10/849,590, filed May 20, 2004, Brown.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A. C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chiuan, Peng, Huei; "A Real-time Rollover Threat Index for Sports Utility Vehicles", Proceedings of the American Control Conference, San Diego, CA, Jun. 1999.

* cited by examiner

ATTITUDE SENSING SYSTEM FOR AN AUTOMOTIVE VEHICLE RELATIVE TO THE ROAD

TECHNICAL FIELD

The present invention relates generally to a control apparatus for controlling a system of an automotive vehicle in response to sensed dynamic behavior and, more specifically, to a method and apparatus for controlling the system of the automotive vehicle by determining an attitude of the vehicle.

BACKGROUND

In recent years, many vehicle control systems have been developed to enhance vehicle stability and tracking performance in critical dynamic situations. Such vehicle control systems include yaw stability control (YSC) systems, roll stability control (RSC) systems, integrated vehicle dynamic control systems, and others. In these systems, knowledge of the vehicle roll and pitch attitude is very important. For example, in yaw stability control systems, the effect of vehicle body roll and pitch, as well as the dynamically changing road super-elevations and road grades, is significant because it directly influences both the vehicle lateral dynamics and lateral acceleration measurements. In roll stability control systems, roll angle is one of the most important variables used to construct feedback pressure command and combat the detected roll instability. Hence, a successful vehicle dynamics control must involve an accurate determination of the vehicle roll and pitch attitude. However, values of roll and pitch are not directly measured on production vehicles and therefore must be estimated instead.

When actively controlling a vehicle's motion using systems such as the braking system, it is important to accurately estimate the state and attitudes of the vehicle. Achieving an accurate sideslip estimate will provide the opportunity to control the vehicle's sideslip to an appropriate value. To those familiar with the art, it is known that sideslip is difficult to determine using inertial sensors due mainly to integration drift, which is caused by sensor offset and contamination of the lateral acceleration signal by gravity. To accurately account for the acceleration due to gravity, it is necessary to know the global roll angle. A roll rate sensor alone can give you an indication of global roll angle, but due to offsets in the roll rate sensor and inaccuracy in the pitch estimate, the error in the global roll angle can quickly accumulate. Therefore, it would be desirable to control this accumulation of error.

SUMMARY OF THE INVENTION

The present invention includes a method to control and account for the accumulation of error in the global roll estimate, and thereby allow for the same in the side slip estimate. This is done through the use of a roll rate sensor and leveraging properties of land vehicle tires. There are several areas in which the teaching of the present invention may be applied. One is for improving side slip estimation using a roll rate sensor. Another is for leveraging linear sideslip angle of the tire to correct for errors in the global roll angle. Yet another is for tire relaxation in the linear sideslip estimate, And yet another is for improving global pitch angle by using improved sideslip estimate. Still another is for accounting for errors in pitch, roll, and sideslip by using robust bounds on each signal.

In one aspect of the invention, a method of controlling a vehicle system comprises determining a vehicle roll rate, determining a lateral velocity of the vehicle in response to the roll rate, and controlling the vehicle system in response to the lateral velocity. It should be noted that the lateral velocity may be used in conjunction with a longitudinal velocity and the controlling may be performed in response to a side slip angle determined in response to the lateral velocity and the longitudinal velocity.

In a further aspect of the invention, a method of controlling a vehicle system includes determining an upper bound pitch angle and a lower bound pitch angle, determining an upper bound roll angle corresponding to the upper bound pitch angle and a lower bound pitch angle corresponding to the lower bound pitch angle. The method further includes determining a lower bound lateral velocity corresponding to the lower bound roll angle and an upper bound lateral velocity corresponding to the upper bound roll angle. The method further includes determining a linear lateral velocity of the vehicle and, when the lower bound lateral velocity is below the linear lateral velocity, adjusting the lower bound to the linear lateral velocity for an adjusted lower bound lateral velocity. In response to the adjusted lower bound lateral velocity, the vehicle system is controlled.

In yet another aspect of the invention, a system for controlling a vehicle system of an automotive vehicle comprises a roll rate sensor for generating a roll rate signal and also a controller coupled to the roll rate sensor. The controller determines a lateral velocity of the automotive vehicle in response to the roll rate signal. The controller also controls the vehicle system in response to the lateral velocity.

Other advantages and features of the present invention will become apparent when viewed in light of the detailed description of the preferred embodiment when taken in conjunction with the attached drawings and appended claims.

DETAILED DESCRIPTION

Figure 1:
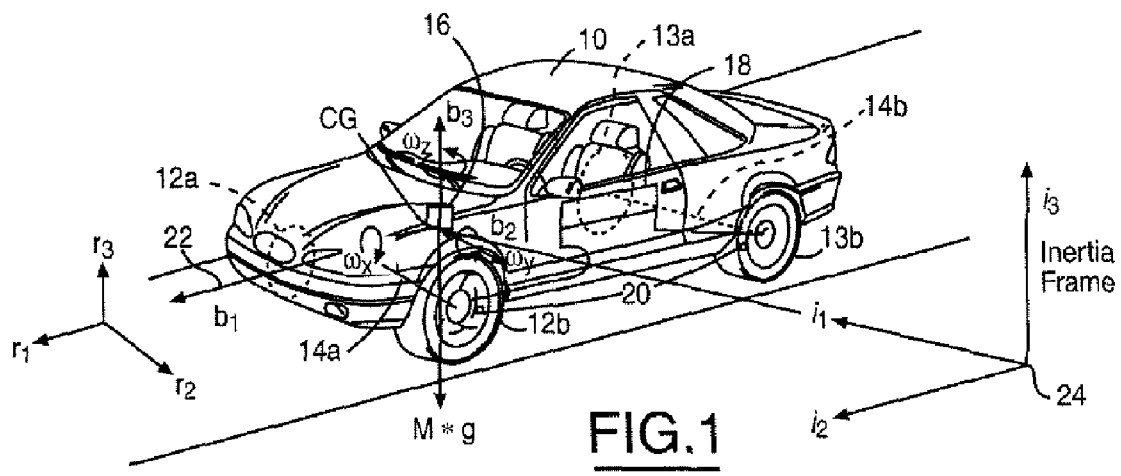
FIG. 1 is a diagrammatic view of a vehicle with variable vectors and coordinator frames according to the present invention.

In the following figures the same reference numerals will be used to identify the same components.

The present invention may be used in conjunction with a rollover control system or a yaw control system for a vehicle. However, the present invention may also be used with a deployment device such as airbag or roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 may use a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations preferably take place in an inertial frame 24 that may be derived from the body frame 22 as described below.

The angular rate sensors and the accelerometers are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four tire/road contact patches.

In the following discussion, the Euler angles of the body frame $b_1b_2b_3$ with respect to the road frame $r_1r_2r_3$ are denoted as $\theta_{xbr}$, $\theta_{ybr}$ and $\theta_{zbr}$, which are also called the relative Euler angles.

Figure 2:
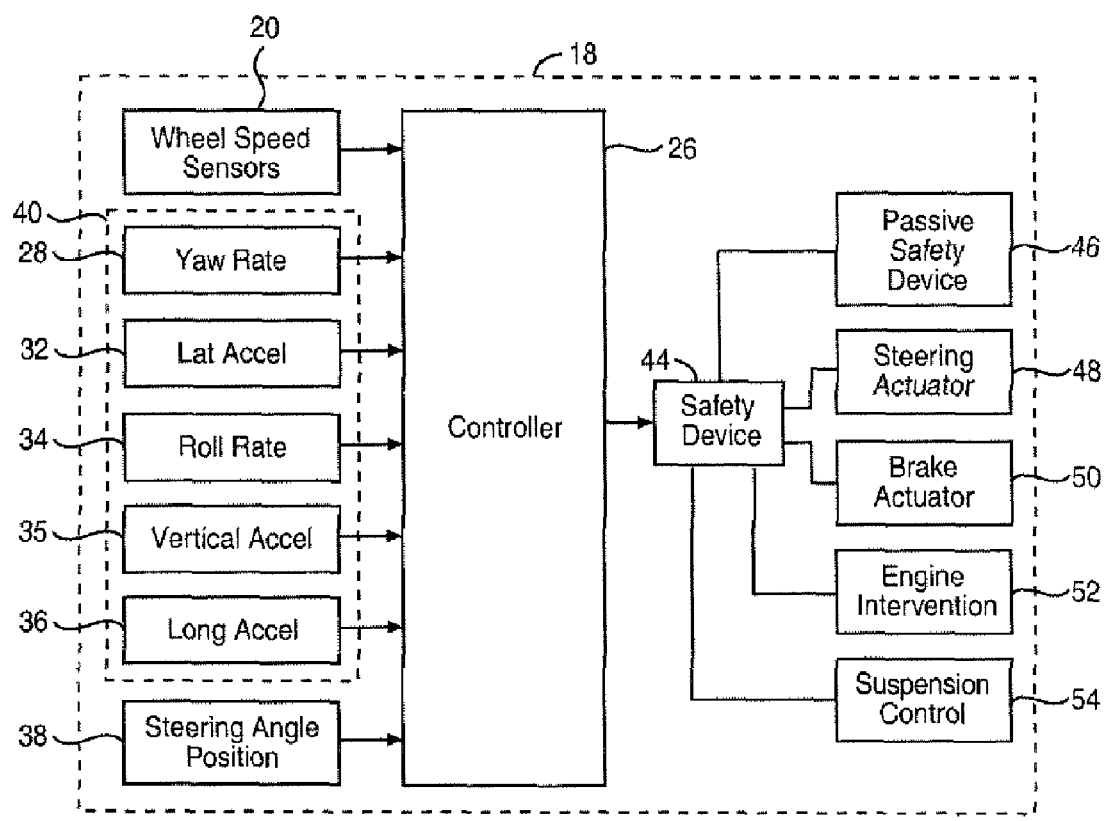
FIG. 2 is a block diagram of a stability system according to the present invention.

Referring now to FIG. 2, roll stability control system 18 is illustrated in further detail having a controller 26 used for receiving information from a number of sensors which may include speed sensors 20, a yaw rate sensor 28, a lateral acceleration sensor 32, a roll rate sensor 34, a vertical acceleration sensor 35, a longitudinal acceleration sensor 36, and steering angle position sensor 38.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-38 may be used in a commercial embodiment. Safety device 44 is part of a vehicle subsystem control. Safety device 44 may control a passive safety device 46 such as an airbag or a steering actuator 48, a braking actuator 50 at one or more of the wheels 12a, 12b, 13a, 13b of the vehicle. Engine intervention 52 may act to reduce engine power to provide a safety function. Also, other vehicle components such as a suspension control 54 may be used to adjust the suspension to prevent rollover.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 48 may control the position of the front right wheel actuator, the front left wheel actuator, the rear left wheel actuator, and the right rear wheel actuator. Although as described above, two or more of the actuators may be simultaneously controlled. For example, in a rack-and-pinion system, the two wheels coupled thereto are simultaneously controlled. Based on the inputs from sensors 28 through 38, controller 26 determines a roll condition and controls the steering position of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Figure 3:
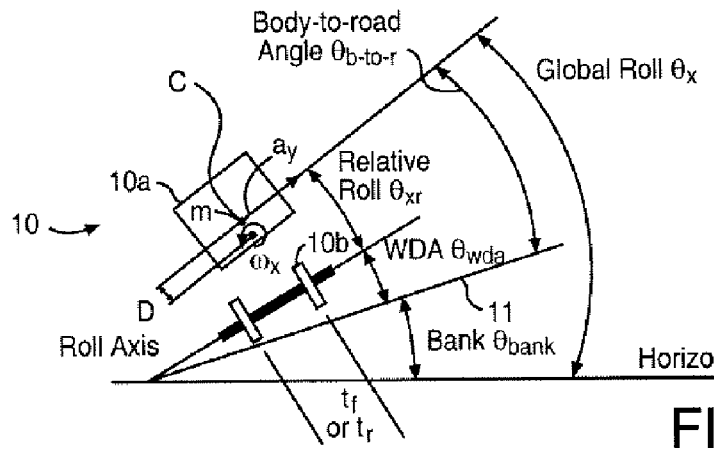
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface 11. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is an important variable that is used as an input to the activation criteria and to construct the feedback brake pressure command, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

The relative or chassis roll angle and the relative pitch angle can be calculated as in U.S. Pat. No. 6,556,908 using the lateral acceleration of the center of gravity of the vehicle body, the roll angular acceleration, and the roll angular velocity, together with vehicle-specific parameters such as the sprung mass, the vehicle body roll moment of inertia, the roll stiffness and damping ratio of the suspensions and the anti-roll-bars, and the distance between the center of gravity of the vehicle body and the floor of the vehicle body. The disclosure of U.S. Pat. No. 6,556,908 is hereby incorporated by reference.

Figure 4:
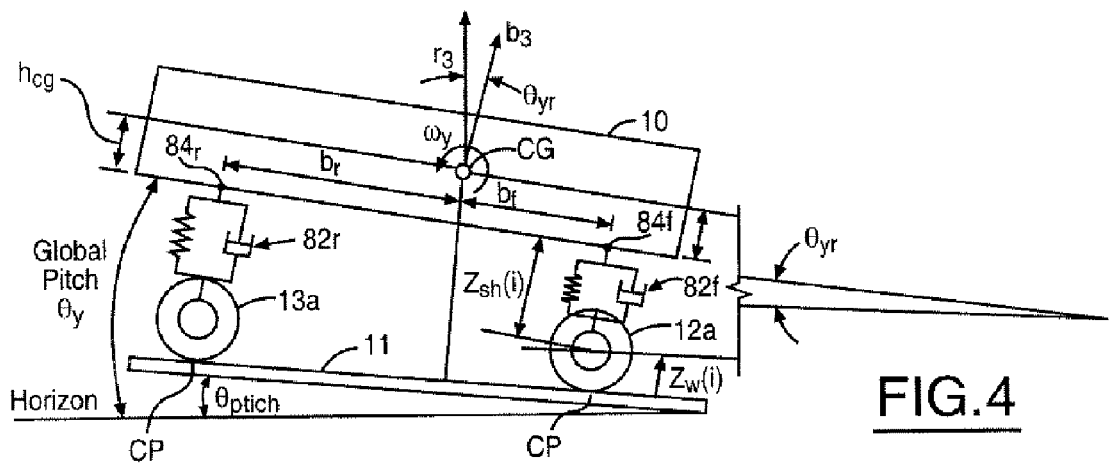
FIG. 4 is a side view of an automotive vehicle illustrating various variables thereon.
Figure 5:
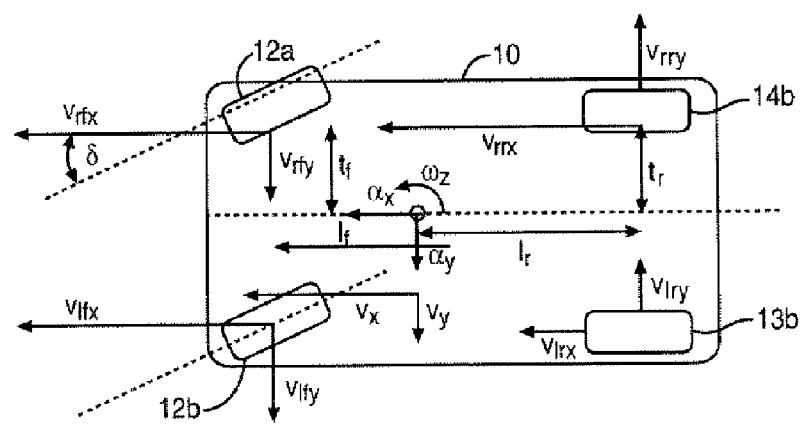
FIG. 5 is a top view of a motor vehicle illustrating various operating parameters of a vehicle experiencing a turning maneuver on a road surface.

Referring now to FIGS. 4 and 5, an automotive vehicle 10 is illustrated with various parameters illustrated thereon. The side view of automotive vehicle 10 is illustrated. A front suspension 82 and a rear suspension 82r is illustrated. The suspensions are coupled to the body at a respective suspension point 84f, 84r. The distance from the suspension point 84f to the center of the wheel is labeled $z_{sh}$. The distance from the center of gravity CG to the front suspension is labeled as $b_f$. The distance from the CG to the rear suspension point 84r is labeled as $b_r$. The vertical distance between the center of gravity and the suspension point are labeled respectively as $h_f$ and $h_r$. A portion of the body axis $b_3$ and the road axis $r_3$ are illustrated. The angle therebetween is the relative pitch angle $\theta_{yr}$. The rolling radius of the tire is labeled as $z_w$. The global pitch angle is $\theta_y$.

Referring now to FIG. 5, a top view of vehicle 10. Those skilled in the art will immediately recognize the basic physics represented by these illustrations, thereby making the adaptation to different types of vehicles easily within their reach. Lateral and longitudinal velocities of the center of gravity are denoted as $V_x$ and $V_y$, a yaw angular rate is denoted as $\omega_z$, a front wheel steering angle is denoted as $\delta$, lateral acceleration is represented by $a_y$, and longitudinal acceleration is represented by $a_x$.

The following description addresses the determination of a side slip angle used for controlling a system of the vehicle. The side slip angle is the arc tangent of the longitudinal velocity divided by the lateral velocity.

Figure 6:
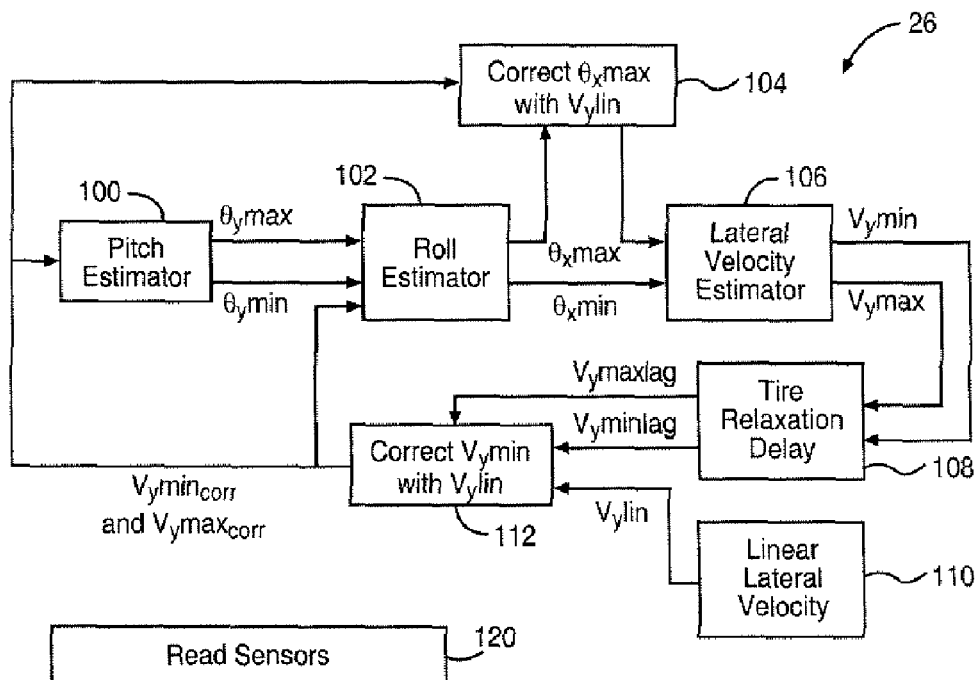
FIG. 6 is a block diagrammatic view of the controller of FIG. 2 according to the present invention.

Referring now to FIG. 6, a block diagrammatic view of controller 26 is illustrated. A pitch estimator 100 is used to generate a maximum or upper global pitch angle boundary $\theta_{ymax}$ and a lower global pitch angle boundary $\theta_{ymin}$. These signals are coupled to a roll estimator 102 that is used to generate a maximum and minimum global roll estimate for the vehicle. The maximum global roll estimate may be modified in the correction box 104. That is, the maximum global roll angle may be modified by the linear lateral velocity as will be further described below. The minimum global roll angle is provided to the lateral velocity estimator 106. It should be noted that the roll estimator maximum or upper boundary, and minimum or lower boundary are derived respectively from the pitch global roll angles. The lateral velocity estimator generates a minimum lateral velocity from the maximum global roll angle. The minimum and maximum lateral velocity is provided to a tire relaxation delay box 108. The tire relaxation delay box 108 generates a filtered lateral velocity that accounts for tire relaxation. A linear lateral velocity block 110 has an output $v_{ylin}$ corresponds to the lateral velocity at the rear axle calculated from the tire properties. The signals from box 108 and 110 are provided to box 112, which corrects the minimum lateral velocity at the rear axle calculated from the inertial sensors provides these signals to the roll estimator 102, the pitch estimator 100, and the correction box 104. As will further be described below, when the minimum lateral velocity falls below the linear lateral velocity, the linear lateral velocity is used in the calculation.

The following variables are used throughout this description:

$V_x$=Longitudinal velocity calculated from the reference velocity module (from the wheel speed sensors)
$dV_x$=Time derivative of longitudinal velocity ($V_x$)
$V_y$=Lateral velocity at the sensor cluster
$A_x$=Longitudinal acceleration measured by the vehicle longitudinal acceleration sensor
r=dynamic rolling radius
ω=raw wheel speed from the wheel speed sensor
α=slip angle of the tire
N=Normal force on a tire
$V_y$max=Maximum lateral velocity at the rear axel calculated from the inertial sensors
$V_y$nom=Nominal lateral velocity at the rear axel calculated from the inertial sensors
$V_y$min=Minimum lateral velocity at the rear axel calculated from the inertial sensors
$V_y$lin=Linear lateral velocity at the rear axel calculated from tire properties
$V_y$min$_{lag}$=$V_y$min, filtered to account for tire relaxation
$V_y$min$_{corr}$=$V_y$min, corrected for $V_y$lin
$\theta_x$=Global/Euler Roll Angle
$\theta_y$=Global/Euler Pitch Angle
$\omega_x$=Roll rate measured by the vehicle roll rate sensor
$\omega_z$=Yaw rate measured by the vehicle yaw rate sensor
g=Acceleration due to gravity The present invention is applicable to any sign combination of lateral velocity and roll angle, but for simplicity, this description is written for a vehicle in a right-hand turn (negative $\omega_z$ and positive $V_y$) and a leftward bank angle (negative $\theta_x$). For a turn in the opposite direction, similar calculations would be used, but $V_y$max would be used in place of $V_y$min.

Figure 7:
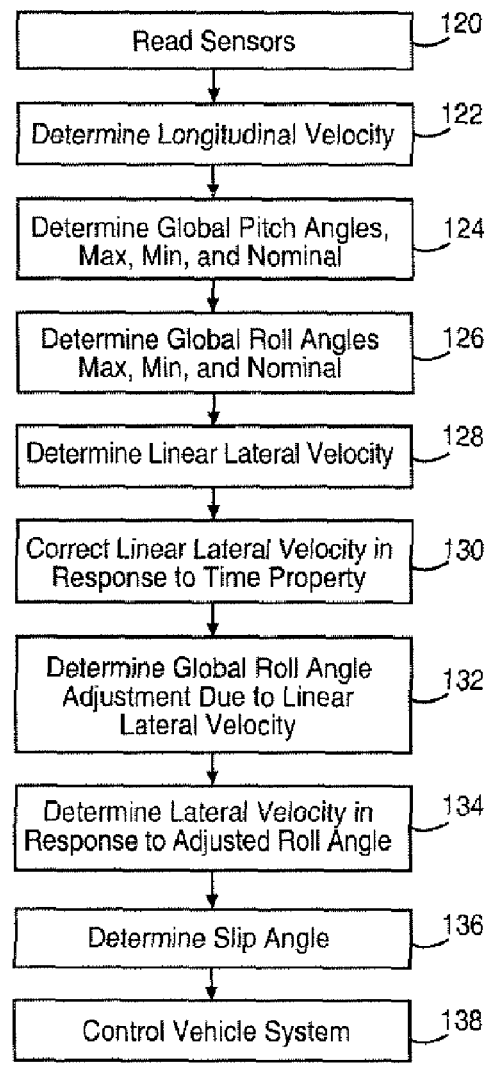
FIG. 7 is a flow chart illustrating a method of controlling a vehicle system in accordance with the present invention.

Referring now to FIG. 7, sensors are read in step 120 to obtain their associated signals. The sensor signals may be filtered, fault checked and plausibility checked prior to use below. In step 122 the longitudinal velocity is determined. Various methods for determining longitudinal velocity of a vehicle are known. A method for correcting longitudinal velocity is set forth below.

The other variable needed for a side slip angle determination is the lateral velocity. The lateral velocity of a land vehicle can be calculated from the inertial sensor output and the previous vehicle state. In this embodiment, it can be estimated by integrating either equation 1 or 2.

$$dV_y/dt = A_y - \omega_z V_x - g \cos\theta_y \sin\theta_x \quad (1)$$

or removing the less significant pitch term $$dV_y/dt \approx A_y - \omega_z V_x - g \sin\theta_x \quad (2)$$

where $\theta_x$ can be found by integrating Equation (4), $$d\theta_x/dt = \omega_x + (\omega_z \sin\theta_x + \omega_z \cos\theta_x)\tan\theta_y \quad (3)$$

removing the less significant terms, and using a small angle approximation, $$d\theta_x/dt = \omega_x + \theta_y \omega_z \quad (4)$$

Determining Global Pitch Angle

From Equation (4), the unknown is the global pitch angle $\theta_y$ is determined in step 124. The yaw rate $\omega_z$ and roll rate are determined from the various sensors. To those skilled in the art, it is know that the instantaneous global pitch angle of a vehicle can be estimated using the following equation:

$$\theta_y = \arcsin((dV_x - A_x - \omega_z V_y)/g) \quad (5)$$

The longitudinal acceleration, $A_x$, and the yaw rate, $\omega_z$, are trivial to determine since they are available sensor signals. Accurately determining the vehicle longitudinal acceleration, $dV_x$, from the wheel speed sensors is desirable. However, if some error can be tolerated the wheel speed sensors alone may be used. A more accurate result is desirable and is sets forth below. That is, when actively controlling vehicle motion using systems such as the braking system, it is important to accurately estimate the state and attitude of the vehicle. The reference velocity is based off of raw wheel speeds and is an important part of the global pitch equation. The global pitch estimate becomes inaccurate during mid to high brake torque gradients because the wheels decelerate at a faster rate than the vehicle until the longitudinal slip ratio reaches equilibrium. The global pitch estimate becomes inaccurate during this transient period because the reference velocity follows the decelerating wheels instead of the actual deceleration of the vehicle.

Accounting for Longitudinal Slip in the Reference Velocity Calculation

The time derivative of the longitudinal velocity, $dV_x$, can often be inaccurate due to brake and drive torque which creates longitudinal slip on the tires.

In order for a tire to produce a longitudinal force, it must have a longitudinal slip, Y. Defined as $$Y = (V_x - r \cdot \omega)/V_x \quad (6)$$

Figure 8:
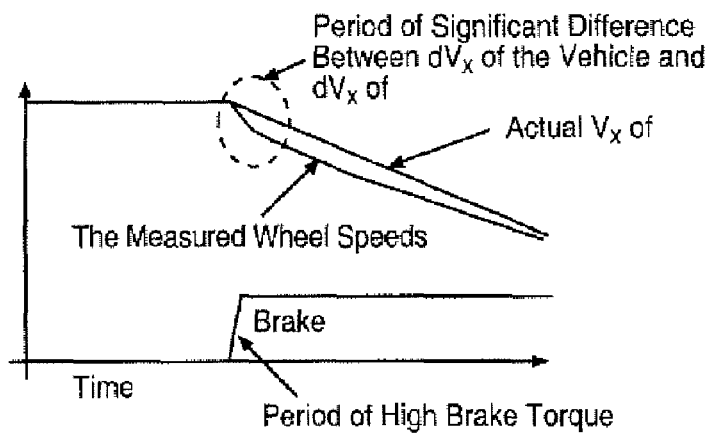
FIG. 8 is a plot illustrating error in $dV_x$ caused by longitudinal tire slip in a global pitch determination.

Due to this tire property, a high brake torque gradient will cause the wheel speeds to decelerate faster than the vehicle, as shown in FIG. 8.

This error in $dV_x$ will cause large errors in estimated global pitch angle. Patent application Ser. No. 10/710,248 filed Jun. 29, 2004, (that is incorporated by reference herein) describes an effective way to produce a reliable longitudinal velocity $V_x$ signal. In order to create a $dV_x$ signal appropriate for use in the pitch equation, the $V_x$ signal is modified to take into account this error caused by linear longitudinal slip.

The longitudinal force, $F_x$, on any given tire can be described the following equation.

$$F_x = C_x YN \quad (7)$$

$C_x$ is a function of tire side slip angle, and can be approximated as follows:

$$C_x = C_{xNOM} - C_{x\alpha}\alpha \quad (8)$$

Where $C_{x\alpha}$ and $C_{xNOM}$ are constants based on tire properties. Combining Equations (7) and (8), $F_x$ is a function of Normal force N, slip angle $\alpha$, slip ratio $\gamma$, and two tire constants $C_{xNOM}$ and $C_{x\alpha}$.

$$F_x = (C_{xNOM} - C_{x\alpha}\alpha) \cdot YN \quad (9)$$

Solving for slip ratio $$Y = F_x/(N \cdot (C_{xNOM} - C_{x\alpha}\alpha)) \quad (10)$$

In a roll stability control system, everything on the right side of this equation is known, or can be determined empirically. Therefore, using this equation, an estimate of the slip ratio at each wheel may be determined. It is important to note that this equation describes the linear portion of the slip-force curve, and therefore will never overestimate the slip ratio.

Finally, correct the wheel speed for each wheel by using the definition of the slip ratio. Equation (11) is shown for the front left wheel. Each of the other wheels may be determined in a similar manner.

$$V_{xCORRECTED\,FL} = r \cdot \omega/(1 - Y) \quad (11)$$

The vehicle reference velocity calculations as described in patent application Ser. No. 10/710,248 can then be performed using $V_{xCORRECTED}$ for each of the wheels, instead of the raw wheel speeds.

To summarize, when the applied wheel torque is small enough to allow a wheel to remain in its linear slip range, the wheel speed will be accurately corrected to the vehicle's actual speed. When the applied wheel torque causes more slip than predicted (i.e. Low mu), the corrected wheel speed will be closer to the actual vehicle speed than the raw wheel speed, but will not totally account the extreme slip ratio caused by the low mu.

Until this invention, the reference velocity of a vehicle has been based off of raw wheel speeds. Using this method it is possible to correct (at least, partially) the raw wheel speed for the theoretical longitudinal slip ratio. This so called, "corrected wheel speed", should have a value closer to the actual longitudinal speed of the vehicle and therefore will provide the reference velocity calculation a more accurate indication of forward velocity.

Once the longitudinal velocity of the vehicle is known, Equation (5) can be used to determine the global pitch angle. This may in turn be used to determine the global roll angle in Equation (4). In step 126, the process is executed three times, once for each of $\theta_x$max, $\theta_x$min, and $\theta_x$nom. The max and min values are maximum and minimum values corresponding to the sensor tolerances used in the determination of $\theta_y$. The max and min values are determined from the nominal values plus or minus the tolerance. These values correspond to $V_y$min, $V_y$max, and $V_y$nom from Equation (2). Since these $V_y$ signals are from the inertial sensor information, they have no phase delay and can be considered the nominal lateral velocity and its robust bounds. All three values tend to drift over time due to uncertainties and offsets accumulated over the period of integration.

Figure 9:
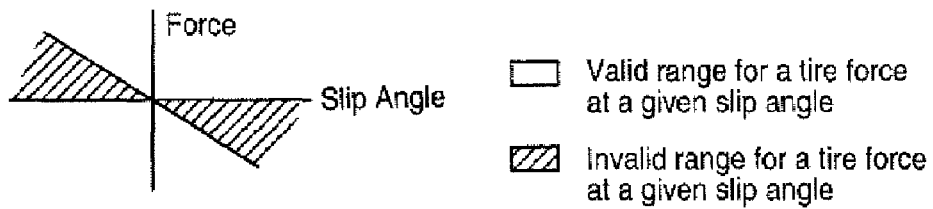
FIG. 9 is a plot of force versus slip angle for a tire illustrating invalid ranges for tire force at a given slip angle.

In step 128 a linear lateral velocity is determined. The linear lateral velocity ($V_y$-lin) is based on the tire properties described in FIG. 9. Mainly, the sign of the lateral force of a tire opposes the sign of the sideslip angle. Additionally, there is a minimum slip angle required in order to generate a given lateral force. This minimum slip angle is proportional to the lateral force. Because tire lateral forces can saturate on a given mu level, an upper bound on the slip angle for a given lateral force is not assumed.

In equation form, and using a small angle approximation for arc tangent, $$V_y\text{-lin} = V_x * \text{RearCorneringCompliance} * A_y\text{rear\_axle} \tag{12}$$

This relationship is valid for steady state conditions, however, in a dynamic situation, there is a delay between the build up of lateral velocity and the onset of lateral acceleration. This is referred to as the "tire relaxation."

Due to the tire relaxation delay, it is not possible to compare the lateral velocity from the inertial measurements directly to the lateral velocity calculated from the tire properties. Therefore, the inertial lateral velocity is delayed using a first order filter which approximates the effects of the tire relaxation. This process produces $V_y$minlag which can be compared directly to $V_y$lin. If $V_y$lin is greater than $V_y$minlag, it is known that $V_y$min cannot be correct due to the tire property described in FIG. 9. $V_y$min is then corrected, by forcing it towards the $V_y$lin value. $V_y$min will be corrected at $t_1$ in FIG. 10, using the following equations:

$$\Delta V_y\text{min} = V_y\text{minlag} - V_y\text{lin} \tag{13}$$

$$V_y\text{min}_2 = V_y\text{min}_1 - \Delta V_y\text{min} \tag{14}$$

The knowledge that $V_y$min is incorrect can provide input to the global roll calculation of Equation (4) in step 132. The three global roll angles $\theta_x$max, $\theta_x$min, and $\theta_x$nom are calculated using the process described in patent application Ser. No. 10/752,741 filed Jan. 7, 2004, which is incorporated by reference herein, with the exception that the $\theta_x$max value can be corrected when it is determined that $V_y$lin exceeds $V_y$min. This is because the primary source of uncertainty in Equation (2) is the global roll angle, it can be assumed that any error in $V_y$min can be attributed to an error in $\theta_x$max. Therefore, $\theta_x$max can be corrected appropriately whenever $V_y$min is corrected.

Figure 10:
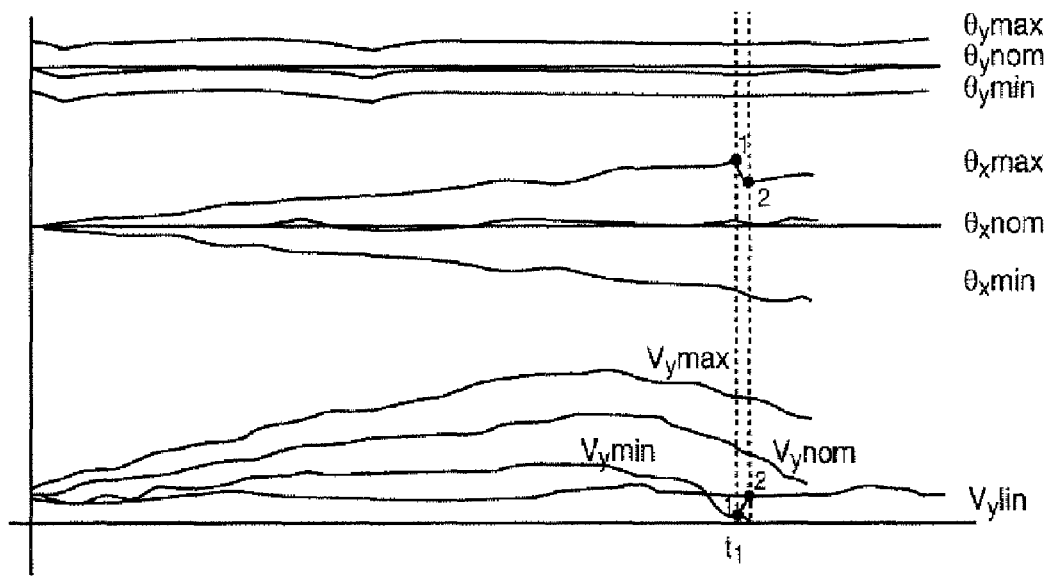
FIG. 10 are timing plots of the correction strategy for lateral velocity and the global roll angle.

In the general form, $\Delta V_y$min is a complex function of the time history of roll error, speed, pitch error, and yaw rate. A simplifying assumption that global roll rate is constant over the interval for which $V_y$min is exceeded by $V_y$lin is made. This allows for a relatively straight forward adjustment of $\theta_x$max based on $\Delta V_y$min using linear interpolation. Equation (15) completes this interpolation and FIG. 10 shows one of the ways that this process will reduce the lateral velocity and global roll uncertainties in step 134.

$$\theta_x\text{max}_2 = \theta_x\text{max}_1 - (\theta_x\text{max} - \theta_x\text{min}) \cdot \Delta V_y\text{min}/(V_y\text{max} - V_y\text{min}) \tag{15}$$

The example above illustrates one scenario where the uncertainties in lateral velocity and global roll angle are reduced. A second scenario occurs whenever $V_y$lin makes a zero crossing. At that time $V_y$max will be corrected to $V_y$lin (instead of $V_y$min being corrected). Therefore, any time there is a zero crossing, the uncertainties on lateral velocity and global roll angle will tend to collapse to very small values.

The global pitch angle module can benefit from an improved lateral velocity estimate. The difficulty with feeding the nominal lateral velocity back into the pitch calculation is that it is possible to create an unstable system. In order to remove that instability from the system, the minimum lateral velocity is feed back into pitch calculation. Even though minimum lateral velocity will still underestimate actual lateral velocity, it will provide an improvement to the pitch calculation over the using $V_y$lin, which often drastically underestimates $V_y$.

In step 136 the adjusted lateral velocity and the longitudinal velocity are used to determine the side slip angle. In step 138 a vehicle system is controlled in response to the side slip angle. It should also be noted that various vehicle systems may be controlled in response to the adjusted lateral velocity, the adjusted roll angle, and the like. Also, it should be noted that various vehicle systems such as safety systems that include dynamic control systems which in themselves may include a yaw stability control or roll stability control systems may be controlled.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of controlling a system onboard a vehicle having wheels, said method comprising the steps of:
   determining the speed of each of said wheels on said vehicle;
   determining the longitudinal velocity of said vehicle;
   determining the longitudinal slip of each of said wheels;
   determining the longitudinal acceleration of said vehicle;
   determining the yaw rate of said vehicle;
   determining the roll rate of said vehicle;
   estimating the pitch angle of said vehicle from said longitudinal velocity, said longitudinal slip, and said longitudinal acceleration;
   estimating the roll angle of said vehicle from said yaw rate, said roll rate, and said pitch angle;
   estimating the lateral velocity of said vehicle from said roll angle;
   estimating a slip angle from said longitudinal velocity and said lateral velocity; and
   controlling said system onboard said vehicle according to said slip angle.

2. A method of controlling a system onboard a vehicle as recited in claim 1, said method further comprising the step of adjusting said lateral velocity so as to approximate the effects of tire relaxation on said wheels.

3. A method of controlling a system onboard a vehicle as recited in claim 1, wherein said slip angle is a side slip angle.

4. A method of controlling a system onboard a vehicle as recited in claim 1, wherein said lateral velocity is estimated from signals received from at least one inertial sensor onboard said vehicle.

5. A method of controlling a system onboard a vehicle as recited in claim 1, said method further comprising the step of adjusting said lateral velocity according to the properties of tires on said wheels.

6. A method of controlling a system onboard a vehicle as recited in claim 1, said method further comprising the steps of:

calculating a linear lateral velocity; and adjusting the estimated lateral velocity with said linear lateral velocity.

7. A method of controlling a system onboard a vehicle as recited in claim 6, wherein said linear lateral velocity is calculated based on the properties of tires on said wheels.

8. A method of controlling a system onboard a vehicle as recited in claim 1, said method further comprising the steps of:

calculating a linear lateral velocity; and adjusting the estimated roll angle based on said linear lateral velocity.

9. A method of controlling a system onboard a vehicle as recited in claim 1, wherein said longitudinal slip of each of said wheels is determined from said speed of each of said wheels and said longitudinal velocity of said vehicle.

10. A method of controlling a system onboard a vehicle as recited in claim 1, wherein said longitudinal slip of each of said wheels is determined from the properties of tires on said wheels.

11. A method of controlling a system onboard a vehicle as recited in claim 1, wherein said system comprises a safety device.

12. A method of controlling a system onboard a vehicle as recited in claim 1, wherein said system comprises a dynamic control system.

13. A method of controlling a system onboard a vehicle as recited in claim 1, wherein said system comprises a roll stability control system.

14. A method of controlling a system onboard a vehicle as recited in claim 1, wherein said system comprises a yaw stability control system.

15. A method of controlling a system on a vehicle, said method comprising the steps of:

determining an upper bound pitch angle and a lower bound pitch angle;

determining an upper bound roll angle corresponding to said upper bound pitch angle and a lower bound roll angle corresponding to said lower bound pitch angle;

determining a lower bound lateral velocity corresponding to said lower bound roll angle and an upper bound lateral velocity corresponding to said upper bound roll angle;

determining a linear lateral velocity of said vehicle;

when said lower bound lateral velocity is below said linear lateral velocity, adjusting said lower bound lateral velocity to said linear lateral velocity to form an adjusted lower bound lateral velocity; and controlling said system on said vehicle in response to said adjusted lower bound lateral velocity.

16. A method of controlling a system on a vehicle as recited in claim 15, said method further comprising the step of:

when said linear lateral velocity crosses zero, adjusting said upper bound lateral velocity to said linear lateral velocity.

17. A method of controlling a system on a vehicle as recited in claim 15, said method further comprising the step of:

adjusting a global roll angle to form an adjusted global roll angle in response to said upper bound roll angle in response to the adjusted lower bound; and wherein the step of controlling comprises controlling said system on said vehicle in response to said adjusted global roll angle.

18. A method of controlling a system on a vehicle as recited in claim 17, said method further comprising the steps of:

determining a side slip angle in response to said adjusted global roll angle; and controlling said system on said vehicle in response to said side slip angle.

19. A method of controlling a system on a vehicle as recited in claim 15, said method further comprising the step of:

determining an adjusted lateral velocity in response to tire characteristics.

20. A method of controlling a system on a vehicle as recited in claim 15, wherein said system on said vehicle comprises a safety system.

21. A method of controlling a system on a vehicle as recited in claim 15, wherein said system on said vehicle comprises a dynamic control system.

22. A method of controlling a system on a vehicle as recited in claim 21, wherein said dynamic control system comprises a roll stability control system.

23. A method of controlling a system on a vehicle as recited in claim 21, wherein said dynamic control system comprises a yaw stability control system.

24. A method of controlling a system on a vehicle as recited in claim 15, wherein said linear lateral velocity corresponds to tire properties of said vehicle.

25. A system for controlling a device onboard a vehicle having wheels, said system comprising:

a plurality of wheel speed sensors for generating wheel speed signals;

a longitudinal acceleration sensor for generating a longitudinal acceleration signal;

a yaw rate sensor for generating a yaw rate signal;

a roll rate sensor for generating a roll rate signal; and a controller for being coupled to said device, said wheel speed sensors, said longitudinal acceleration sensor, said yaw rate sensor, and said roll rate sensor;

wherein said controller is operable to:

determine the speed of each of said wheels on said vehicle;

determine the longitudinal velocity of said vehicle;

determine the longitudinal slip of each of said wheels;

determine the longitudinal acceleration of said vehicle;

determine the yaw rate of said vehicle;

determine the roll rate of said vehicle;

estimate the pitch angle of said vehicle from said longitudinal velocity, said longitudinal slip, and said longitudinal acceleration;

estimate the roll angle of said vehicle from said yaw rate, said roll rate, and said pitch angle;

estimate the lateral velocity of said vehicle from said roll angle;

estimate a slip angle from said longitudinal velocity and said lateral velocity; and control said device onboard said vehicle according to said slip angle.

26. A system as recited in claim 25, wherein said controller is further operable to adjust said lateral velocity so as to approximate the effects of tire relaxation on said wheels.

27. A system as recited in claim 25, said system further comprising a longitudinal velocity sensor for generating a longitudinal velocity signal, wherein said controller is operable to determine said longitudinal velocity of said vehicle from said longitudinal velocity signal.

28. A system as recited in claim 25, said system further comprising at least one inertial sensor coupled to said controller, wherein said controller is operable to estimate said lateral velocity of said vehicle based on signals received from at least one said inertial sensor.

29. A system as recited in claim 25, wherein said controller is operable to calculate a linear lateral velocity and adjust the estimated lateral velocity with said linear lateral velocity.

30. A system as recited in claim 25, wherein said controller is operable to calculate a linear lateral velocity and adjust the estimated roll angle based on said linear lateral velocity.

31. A system as recited in claim 25, wherein said controller is operable to determine said longitudinal velocity from said wheel speed signals.

* * * * *